Patented Sept. 7, 1948

2,449,001

UNITED STATES PATENT OFFICE 2,449,001

PRODUCTION OF 1,3-DIOLS

Louis A. Mikeska and Erving Arundale, Westfield, N. J., assignors to Standard Oil Development Company, a corporation of Delaware No Drawing. Application May 27, 1944, Serial No. 537,739

8 Claims. (Cl. 260—635)

This application is a continuation-in-part of application Serial No. 291,107, filed August 19, 1939, now abandoned.

The present invention relates to a method for the production of 1,3-dihydric alcohols (glycols) or their derivatives from low molecular weight aliphatic olefins or olefins substituted by an aromatic nucleus, hydroaromatic olefins, dienes, substituted unsaturated compounds, or mixtures of these with saturated hydrocarbons by condensing the unsaturated compounds with aldehydes in the presence of dilute ternary or quaternary mineral acids, or other acid-acting compounds as catalysts. Ternary and quaternary mineral acids are those mineral acids whose molecules consist of three and four different types of atoms, respectively. Other unsaturated compounds, such as unsaturated ethers and halides, may also be used. The simplest compound made according to this method is 1,3-propylene glycol or 1,3-propanediol which is formed in the reaction of ethylene with formaldehyde.

1,3-propanediol has been found among the by-products of the fermentation of glycerol and glucose. 1,3-butanediol has been prepared by the reduction of acetaldol and by the action of magnesium amalgam on aqueous acetaldehyde. Higher members of the series can be prepared by similar reactions from the corresponding aldehydes and aldols, but these synthetic methods cannot be considered to be on a commercial basis. It has also been proposed to produce 1,3-butanediol by reacting propylene with formaldehyde-hydrate at approximately 70° C., under pressure, and in the presence of hydrogen chloride, as in U. S. Patent 2,143,370. In this process the yields of 1,3-butanediol are low due to the formation of beta-chlorobutanol and other by-products. It is therefore apparent that a new method for producing such compounds in higher yields is desirable.

According to the present invention, olefins and aldehydes are condensed in the presence of dilute aqueous solutions of ternary or quaternary mineral acids, such as sulfuric, sulfurous, phosphoric, phosphorous, fluorsulfonic, fluosilicic, dihydroxy fluoboric, and hydrofluoboric acids or acid-acting metallic salts of polybasic mineral acids, such as $NaHSO_4$, $NaH_2PO_4$, $ZnSO_4$, $Fe_2(SO_4)_3$, $Al_2(SO_4)_3$ and the like, of between .01 and 5% concentration, at elevated temperatures and pressures, the pressure used being at least equal to the vapor pressure of the reaction mixture at the operating temperature. The olefin should be present in excess of the amount required to give a 1/1 olefin-aldehyde mole ratio. Dilute acids, or other acid-acting catalysts, of between 0.01 and 5% concentration are used in order to minimize the formation of cyclic diethers. The aldehyde may be aliphatic, such as formaldehyde (formalin), acetaldehyde, propionaldehyde, aromatic, such as benzaldehyde, araliphatic, or any compound, such as paraldehyde, or trioxymethylene or other polymers of formaldehyde, which will decompose to yield an aldehyde, may be used. The reaction may be brought about by contacting an aldehyde with an excess of olefin at elevated temperatures in the presence of a dilute mineral acid-acting catalyst in a closed container capable of withstanding high pressures and maintaining contact between the reactants by agitation until the reaction is completed, as indicated by the constancy of the pressure. When the materials are first heated, the pressure increases until the desired operating conditions are attained, after which the pressure gradually diminishes as the reaction proceeds.

It has been further found that there is a definite relationship between the ratio of water to aldehyde present in the reaction mixture and the amount of diol obtained as a reaction product. This ratio has been determined as being about three parts by weight of water as a minimum to one part by weight of aldehyde. Any further reduction in the amount of water below this minimum results in a sharp reduction in the quantity of diol obtained from the reaction. Larger amounts of water in the relation to the aldehyde present in the reaction may be used and an increasingly larger percentage yield of diol is obtained thereby, such increase in water content present in the reaction mixture being limited or controlled only by the economics of mechanical handling and distribution. It has been found that as much as 30 parts of water per part of aldehyde can be readily handled, although it is preferred to use about 20 parts by weight of water to 1 part by weight of aldehyde.

The temperature necessary for the reaction between an olefin and an aldehyde to form dihydric alcohols differs with the different olefins according to the reactivity of the olefin. The lower olefins are less reactive and require higher temperatures. With propylene, for example, temperatures of 135–140° C. give good results, with ethylene, temperatures above about 150° C. are desirable, and with tertiary olefins, such as isobutylene, temperatures as low as 50° C. are quite satisfactory. The optimum acid strength also varies with the olefin used.

In cases when the olefin charged is normally gaseous, the unreacted hydrocarbon material is bled off from the pressure vessel after it has cooled to room temperature following completion of the reaction. In all cases, the reaction mixture is neutralized and filtered, and the water and other constituents boiling below the boiling point of the dihydric alcohol are removed from the filtrate by distillation. This aqueous distillate may be recycled to the olefin-aldehyde condensation reactor, since it contains diethers and other products; the presence of such products in the reactor tends to repress the formation of similar products in the next condensation reaction. The residue from the first distillation step is vacuum-distilled to yield the pure 1,3-dihydric alcohol. Small amounts of cyclic diethers, saturated aliphatic alcohols, polymers of the glycols, hydrocarbon polmers and diolefins are formed as by-products in these reactions. As the concentration of the acid-acting catalyst is increased, the saturated alcohol yields decrease and the cyclic diether yields increase. The method of this invention may be operated as a batch or continuous process, and as a liquid- or vapor-phase process.

The products are generally liquids boiling above 200° C. and having a specific gravity greater than 1.0. They are useful as solvents, freezing point depressants, and intermediates in the production of synthetic resins. They may also be dehydrated to dienes or nitrated for the production of Diesel fuel ignition promoters.

The following examples are given for the purpose of illustrating the invention:

*Example 1*

150 parts by weight of propylene and 81 parts by weight of trioxymethylene (paraformaldehyde), together with 162 parts by weight of 3% sulfuric acid equivalent to 1.95 parts of water per part of formaldehyde on a weight basis, were placed in a one-liter copper-lined bomb capable of withstanding 2000 lbs./sq. in. gauge pressure and agitated therein. The bomb was heated to 142° C. and was maintained at this temperature for 17 hours. The pressure rose as the temperature increased until it was about 940 lbs./sq. in. gauge at 142° C.; the pressure gradually decreased as the reaction proceeded, although the temperature remained substantially constant. The bomb and its contents were cooled at the end of the reaction period, and the excess olefin was bled off. The excess olefin amounted to 68 parts by weight and could be recycled if desired. The contents of the bomb, 325 parts by weight, were neutralized with sodium carbonate and filtered, and the filtrate was distilled under a fractionating column. After removal of the water and low-boiling by-products by distillation at 100° C., the residue was vacuum distilled under 2 mm. pressure; 125 parts by weight of pure 1,3-butanediol (boiling point, 204° C. at 760 mm.) were obtained in the distillate. This is equivalent to a 50% yield of dihydric alcohol based upon the aldehyde charged. By using a larger proportion of dilute acid based upon the aldehyde charged, a higher yield of dihydric alcohol may be obtained.

*Example 2*

646 parts of 3% sulfuric acid equivalent to 20.8 parts of water per part of formaldehyde, 30 parts of trioxymethylene, and 60 parts of propylene (all parts by weight) were contacted in a copper-lined bomb at 135° C. for 17 hours. The glycol was isolated as in Example 1. 63 parts of 1,3-butanediol, equivalent to a 70% yield based upon the aldehyde charged, were obtained in this reaction.

*Example 3*

250 parts of 3% sulfuric acid equivalent to 3 parts of water per part of formaldehyde, 81 parts of trioxymethylene and 150 parts of propylene (all parts by weight) were contacted in a copper-lined bomb at 135° C. for 17 hours. The glycol was isolated as in Example 1. 133.6 parts of 1,3 butanediol, equivalent to a 55% yield based upon the aldehyde charged, were obtained in this reaction.

We claim:

1. A method for producing 1,3-diols which comprises reacting an olefin with an aldehyde at elevated temperatures and pressures in the presence of sulfuric acid of from .01 to 5% concentration, the weight of the water present in said sulfuric acid being at least 3 times the weight of the aldehyde charged.

2. The process of producing 1,3-diols which comprises reacting an olefin with formaldehyde at elevated temperatures and pressures in the presence of sulfuric acid of from .01 to 5% concentration, the weight of the water present in said sulfuric acid being at least 3 times the weight of the formaldehyde charged.

3. The process of producing 1,3-diols which comprises reacting a primary olefin with formaldehyde at a temperature of at least 150° C. and at a pressure at least equal to the vapor pressure of the reaction mixture in the presence of sulfuric acid of from .01 to 5% concentration, the weight of the water present in said sulfuric acid being at least 3 times the weight of the formaldehyde charged.

4. The process of producing 1,3-diols which comprises reacting a secondary olefin with formaldehyde at a temperature of at least 135° C. and at a pressure at least equal to the vapor pressure of the reaction mixture in the presence of sulfuric acid of from .01 to 5% concentration, the weight of the water present in said sulfuric acid being at least 3 times the weight of the formaldehyde charged.

5. The process of producing 1,3-diols which comprises reacting a tertiary olefin with formaldehyde at a temperature of at least 50° C. and at a pressure at least equal to the vapor pressure of the reaction mixture in the presence of sulfuric acid of from .01 to 5% concentration, the weight of the water present in said sulfuric acid being at least 3 times the weight of the formaldehyde charged.

6. The process of producing 1,3-butanediol which consists in reacting propylene with formaldehyde at temperatures above 100° C. and at elevated pressures in the presence of .01 to 5% sulfuric acid, the weight of the water present in said sulfuric acid being from 3 to 30 times the weight of the formaldehyde charged, neutralizing the reaction product, and recovering the dihydric alcohol from the neutralized mixture.

7. The process of making 1,3-butanediol which consists in reacting propylene with formaldehyde at temperatures above 100° C. and at a pressure at least equal to the vapor pressure of the reaction mixture in the presence of 3% sulfuric acid, the weight of the water present in said sulfuric acid being about 20 times the weight of the formaldehyde charged, removing the unreacted olefin, neutralizing the reaction mixture, filtering, removing the water and other low boiling constituents from the filtrate by distillation under reflux conditions, and then vacuum distilling the residue from the first distillation step to recover the pure dihydric alcohol.

8. The process of making 3-methyl-1,3-butanediol which consists in reacting isobutylene with formaldehyde at a temperature above 50° C. and at a pressure at least equal to the vapor pressure of the reaction mixture in the presence of 1% sulfuric acid, the weight of the water present in said sulfuric acid being about 20 times the weight of the formaldehyde charged, removing the unreacted olefin, neutralizing the reaction mixture, filtering, removing the water and other low boiling constituents by distillation in a fractionating column, and then vacuum distilling the residue to recover the pure dihydric alcohol.

LOUIS A. MIKESKA.
ERVING ARUNDALE.

REFERENCES CITED

The following references are of record in the file of this patent:

UNITED STATES PATENTS

| Number | Name | Date |
| --- | --- | --- |
| 2,143,370 | Fitzky | Jan. 10, 1939 |
| 2,241,777 | Friedrichsen | May 13, 1941 |
| 2,325,760 | Fitzky | Aug. 3, 1943 |
| 2,350,485 | Arundale | June 6, 1944 |

FOREIGN PATENTS

| Number | Country | Date |
| --- | --- | --- |
| 717,712 | France | Jan. 13, 1932 |

OTHER REFERENCES

Prins, "K. Akad, v. Wetenschapen, Proceedings Sec. Science," vol. 22, pages 51–6 (1919).

Ellis, "Chemistry of Petroleum Derivatives," vol. II, pages 623–5.